March 27, 1934.  B. BEDFORD  1,952,529
MOLDED ARTICLE
Original Filed Feb. 27, 1930
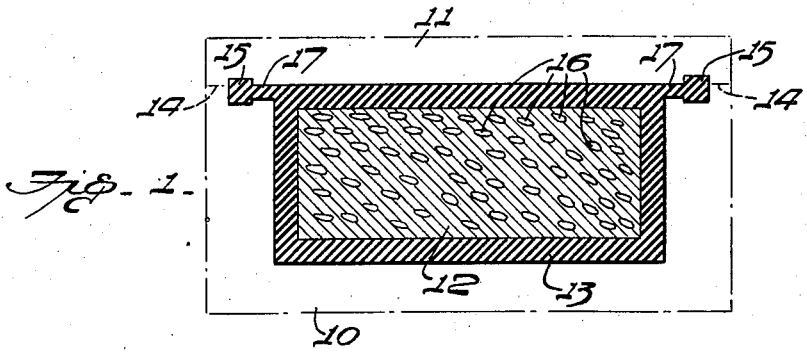
Fig. 1.
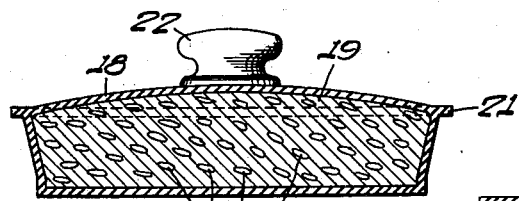
Fig. 2.
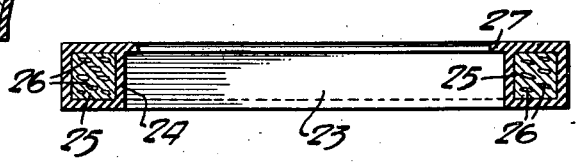
Fig. 4.
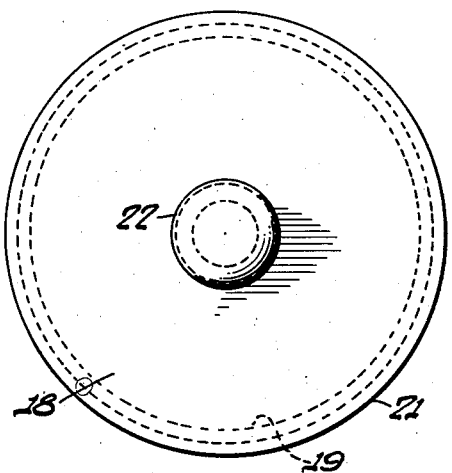
Fig. 3.
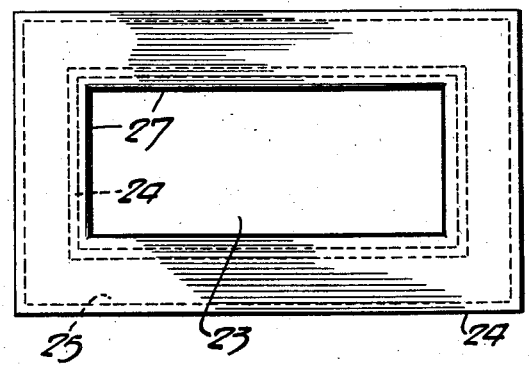
Fig. 5.
BRUCE BEDFORD
INVENTOR
BY 
ATTORNEY Patented Mar. 27, 1934

1,952,529

UNITED STATES PATENT OFFICE 1,952,529

MOLDED ARTICLE

Bruce Bedford, Trenton, N. J.

Original application February 27, 1930, Serial No. 431,901. Divided and this application October 3, 1932, Serial No. 636,093

10 Claims. (Cl. 220—24)

The invention relates to a molded article of manufacture possessing high insulating and sanitary properties. More particularly the invention resides in a molded article and comprises an integral impervious casing of a material, which during the process of manufacture becomes fluent, when heated, and which hardens upon cooling, such as hard rubber, otherwise known as ebonite, the interior of such casing being filled with insulating material, preferably of a porous spongy nature, such as cork, from which air has been removed. Such articles may be constructed in different forms, according to the uses to which they are to be put, and have been successfully utilized as lids for ice cream cabinets, for insulating door frames, and in other situations where high insulating and sanitary properties are necessary or desirable.

According to a preferred method of manufacture, which is the subject of my copending application Serial No. 431,901, filed February 27, 1930, a coating of hard rubber is molded about a core of cork or similar porous spongy insulating material, such coating being continuous and integral, and extending over the entire surface of the interior slab of insulating material. The coated slab within the mold is then subjected to heat and pressure, the heat being sufficient to render the rubber fluent, and the pressure being sufficient to force air out of the insulating material. Subsequently the insulating material is permitted to expand while entirely covered with the impervious rubber coating, the result being that vacuum spaces exist within the body of the insulating material in place of the air, thus producing an article having improved insulating properties.

The above is a brief description of the improved article and a preferred method of manufacture, but the invention will be more readily understood by reference to the accompanying drawing and more detailed description which will follow hereinafter.

In the drawing,

Fig. 1 is a diagrammatic sectional view of an article embodying my invention, enclosed in a mold indicated in broken lines, in which the article is formed;

Fig. 2 is a sectional view of a molded article embodying the invention made in the form of an ice cream lid;

Fig. 3 is a top plan view of the lid;

Fig. 4 is a sectional view of a molded article embodying the invention made in the form of a sliding door frame;

Fig. 5 is a top plan view of the same.

The molded article may be produced in any desired manner, but in order that the invention may be fully understood, a preferred method of manufacturing the article will now be described.

Referring particularly to Fig. 1, the reference numeral 10 denotes the bottom portion of a mold, and the numeral 11 a separate upper portion of the same mold, used for the production of my improved hard rubber coated insulating article. A slab 12 of cork or other suitable insulating material is first placed within the lower section 10 of the mold, with the hard rubber compound in plastic condition around the slab so as to completely cover all portions of the central core of insulating material, this rubber compound being in an amount in excess of that which will be present in the completed article.

The upper section 11 of the mold is placed in position and pressure is then applied, producing compression of the core of insulating material to reduced size.

All or a substantial portion of the air previously included within the core of insulating material escapes through the split 14 in the mold, to the outer atmosphere. The hard rubber compound, during this stage of the process, flows only to a sufficient degree to permit the escape of air.

Heat is now applied sufficient to cause the hard rubber compound to become soft, and to flow freely. This causes the excess of hard rubber compound to flow through the split 14 in the mold to the overflow space 15, such excess being forced out partly by the expansion of the compressed core 12 of insulating material. The insulating material returns to approximately its original size, due to the resiliency or spring of the insulating material, which is sufficient to force the excess of flowing hard rubber compound out of the form and into the overflows. When this operation is completed, the temperature is again raised, and the curing process is started.

When the curing is completed, the core of insulating material is entirely surrounded by a permanent impervious integral coating of hard rubber, and vacuum spaces, indicated at 16, take the place of air previously within the core. Preferably a rim 17 is formed integral with the rubber coating or casing 13.

The molded article possesses greater insulating and sanitary properties than others commonly in use. The insulating core is entirely surrounded by the impervious outer coating, so that it is impossible for air or moisture to enter and fill the vacuum spaces.

The molded article of manufacture may be employed for various uses, several of which are illustrated in Figs. 2 to 5. Figs. 2 and 3 show an ice cream cabinet lid comprising an outer hard rubber casing 18, which entirely covers a core of cork or other insulating material 19 having vacuum spaces 20 within the same. A flange 21 is formed integral with the rubber casing 18, and provides a rest for the lid. A suitable handle 22, which may be of hard rubber or other desired material, is attached to the lid.

In Figs. 4 and 5, the invention is shown as applied to a sliding door frame which surrounds an open space 23. The frame possesses insulating properties, and comprises a casing 24, preferably of hard rubber, which completely surrounds the insulating core 25 of cork or other light spongy insulating material, having vacuum spaces 26 therewithin. One or more flanges 27 may be formed integrally with the casing 24 to form a backing for a panel of glass or other material used to close the space 23.

Obviously the invention is capable of other modifications, those described being merely illustrative of the broad utility of the device.

I claim as my invention:

1. A molded article of manufacture comprising a spongy core, and a structurally hard, non-resilient molded air and moisture tight casing completely surrounding and covering the core, said core having vacuum spaces within its interior.

2. A molded article of manufacture comprising a spongy core having vacuum spaces therein, and a structurally hard, non-resilient molded casing completely surrounding and covering the core and serving to exclude air and moisture from the core and to maintain said vacuum spaces therein.

3. A molded article of manufacture comprising a unitary homogeneous spongy core, and a unitary molded air and moisture impervious ebonite casing completely surrounding and covering the spongy core having vacuum spaces therein.

4. An insulating block comprising a unitary homogeneous cork core having vacuum spaces therein, and a unitary molded air and moisture impervious ebonite casing completely surrounding the inner core.

5. A molded article of manufacture having heat insulating properties, comprising a spongy porous core having vacuum spaces therein and a unitary air and moisture impervious ebonite casing completely surrounding the core.

6. A molded article of manufacture comprising a cork core having vacuum spaces therein and having an imperforate integral hard rubber casing impervious to air completely surrounding the core.

7. An ice cream cabinet lid comprising an impervious integral molded hard rubber casing completely surrounding a cork core, said core having vacuum spaces therewithin to improve its insulating properties, a rubber flange integral with the casing, and a handle secured to the lid.

8. A sliding door frame, rectangular in form, surrounding an open space for the inclusion of a panel, said frame comprising an outer air and moisture impervious ebonite casing completely surrounding an insulating core, said core having vacuum spaces therein.

9. A sliding door frame, rectangular in form, surrounding an open space for the inclusion of a panel, said frame comprising an outer molded hard rubber casing impervious to air and moisture completely surrounding a spongy core, said core being provided with vacuum spaces to improve its insulating properties, and a flange formed integral with the rubber casing and extending into the central space to form a backing for the panel.

10. A molded article of manufacture having heat insulating properties, comprising a spongy porous core having vacuum spaces therein, a unitary ebonite casing impervious to air and moisture completely molded around the core, and a flange formed integrally with the casing.

BRUCE BEDFORD.